J. IRELAND.
CAR-TRUCK.

No. 181,177. Patented Aug. 15, 1876.

Witnesses:
Geo. W. Tibbitts
Frank R. Tibbitts

Inventor:
Joseph Ireland

UNITED STATES PATENT OFFICE.

JOSEPH IRELAND, OF CLEVELAND, OHIO.

IMPROVEMENT IN CAR-TRUCKS.

Specification forming part of Letters Patent No. 181,177, dated August 15, 1876; application filed November 27, 1875.

*To all whom it may concern:*

Be it known that I, JOSEPH IRELAND, of Cleveland, in the county of Cuyahoga and State of Ohio, have invented a Car-Truck, of which the following is a specification:

This invention relates to certain improvements in the construction of car-trucks for railways; and consists in the combination of a large friction-wheel with the axle and its peculiarly-formed curved slotted bearings, all constructed, arranged, and operating as hereinafter specified, the object being to render the propulsion of the car less difficult, and to allow more freedom for the play of a wheel and axle in passing over an obstruction, and also overcome the cramping of the wheels in going around curves.

To enable others to fully understand my invention, I proceed to describe the same in detail, with the aid of the accompanying drawings, in which—

Figure 2:
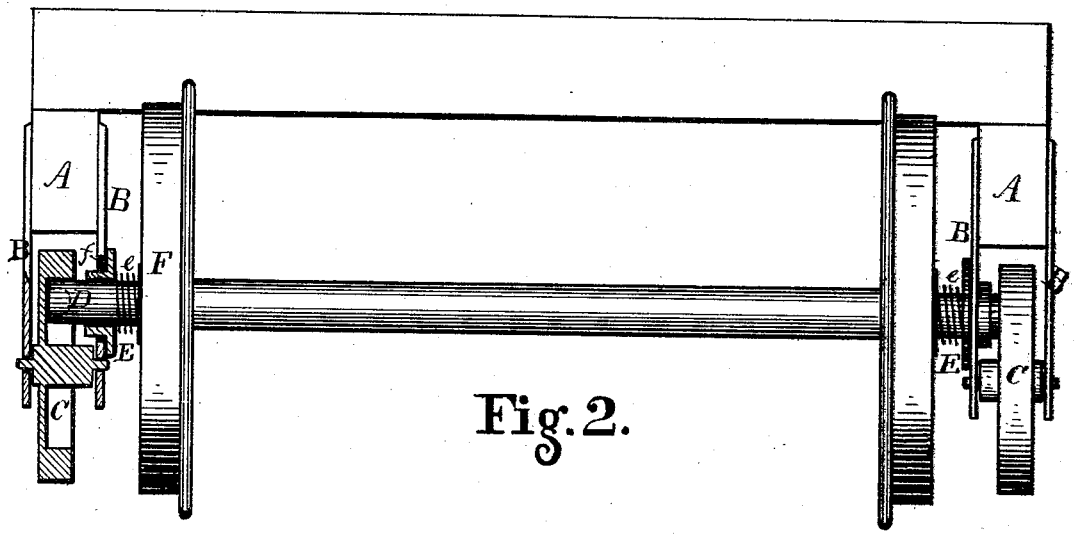
Figure 1:
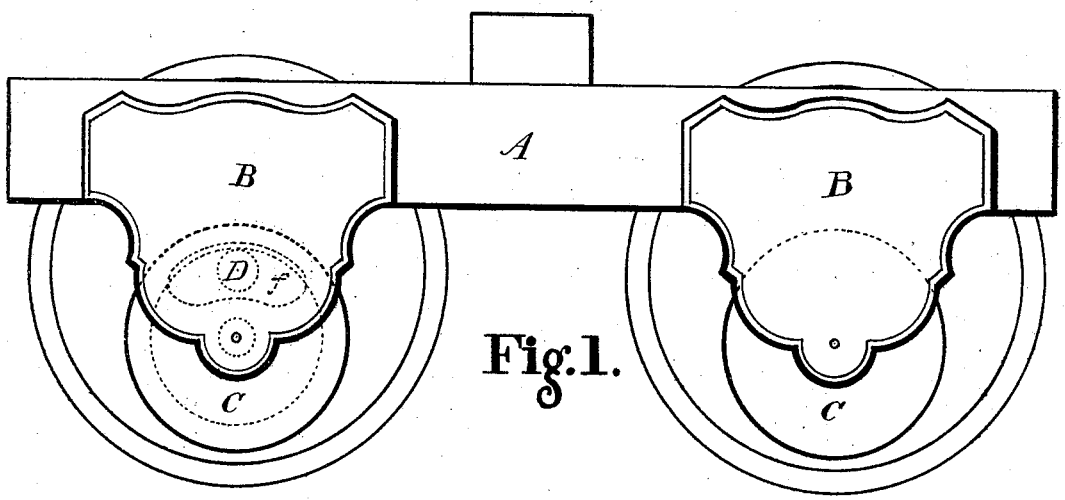

Figure 1 is a side elevation. Fig. 2 is an end elevation.

A is the frame of the truck. B B are brackets, one secured on each side of the frame-piece A. C is a friction-wheel journaled in the lower part of the brackets B B, said wheel consisting of a disk having a heavy annular flange on one side at its periphery, the inside surface of which flange being the bearing-surface for the axle-journal. The inside bracket has a curved slot, $f$, (seen in dotted line, Fig. 1,) through which the axle D passes. The axle here has a flanged friction-collar, E, upon it, for the purpose of preventing the wear or cutting of the journal in case it should be swung over against the bracket, as when brakes should be forcibly applied. A short spiral spring, $e$, between the collar and hub of the wheel F, serves to keep the collar in place. To prevent friction of the end of the axle against the inside surface of the wheel C, there is a cavity in the end of the axle, in which a ball is placed to serve as a friction-roller.

The advantages of this mode of construction are: simplicity of construction, and the small number of parts; the ease and freedom of operation, as, when the car-wheel passes over an obstruction on the track, the car receives a gentle oscillating motion, as though it were on springs; and, again, when turning curves in the road, the freedom of the axle to oscillate in its bearings permits the axles to accommodate themselves to the curvature of the track, and thus avoid the usual cramping of wheels, as in fixed or unyielding bearings; again, the ease with which the car is propelled, rendering a car less difficult to start and to be kept moving, avoiding the strain upon the horse, and liability of galling the horse's neck and shoulders, and the jarring of the car.

This mode of constructing and applying a friction-roller to journals can be extended to pulley-blocks, and other similar uses to which I intend applying it.

Springs underneath the car may also be employed with this truck, the same as with those now in use.

Having described my invention, I claim—

1. The axles D, provided with collars E, and rotating in curve-slotted bearings, substantially as and for the purpose described.

2. The combination of the axles D, collars E, curve-slots $f$, and springs $e$, substantially as and for the purpose described.

3. The combination of the axle D, the friction-wheel C, and the curve-slotted bearings or brackets B $f$, the said axle having freedom to reciprocate within the bracket B, substantially as and for the purpose set forth.

4. The combination of the axles D, having friction-balls in their ends, with the friction-wheels C, substantially as and for the purpose specified.

JOSEPH IRELAND.

Witnesses:
GEO. W. TIBBITTS,
ALFRED ELWELL.